(12) United States Patent
Vantouroux

(10) Patent No.: US 6,902,138 B2
(45) Date of Patent: Jun. 7, 2005

(54) DEVICE FOR HOLDING PIPES

(75) Inventor: Patrick Vantouroux, Fleury les Aubray (FR)

(73) Assignee: Amphenol-Air LB, Colombes (FR)

( * ) Notice: Subject to any disclaimer, the term of this patent is extended or adjusted under 35 U.S.C. 154(b) by 0 days.

(21) Appl. No.: 10/634,131

(22) Filed: Aug. 4, 2003

(65) Prior Publication Data
US 2004/0124320 A1 Jul. 1, 2004

(30) Foreign Application Priority Data

Aug. 9, 2002 (FR) .......................................... 02 10168

(51) Int. Cl.$^7$ ................................................ F16L 2/22
(52) U.S. Cl. ..................................... 248/68.1; 248/74.4
(58) Field of Search ...................... 248/65, 68.1, 74.3, 248/74.4, 73, 316.6

(56) References Cited

U.S. PATENT DOCUMENTS 5,257,768 A * 11/1993 Juenemann et al. ........ 248/604
6,523,790 B2 * 2/2003 Sentpali et al. ............ 248/68.1

* cited by examiner

Primary Examiner—Leslie A. Braun
Assistant Examiner—Kofi Schulterbrandt
(74) Attorney, Agent, or Firm—Meyertons, Hood, Kivlin, Kowert & Goetzel, P.C.; Eric B. Meyertons

(57) ABSTRACT

A device for holding pipes including two complementary parts intended for assembly, each having in its assembly face, at least one recess of a semicylindrical overall shape. Upon assembly, the corresponding recesses of the two parts form a shape that roughly corresponds to the exterior cross section of a pipe to be held between the two parts. Each part includes a body having at least one recess and is made of a rigid material. The radius of the recess exceeds the exterior radius of the pipe to be held and is lined with an intermediate half-shell made of an elastic material. The intermediate half-shell is further lined with an inner half-shell made of a rigid material. The interior radius of the inner half-shell corresponds roughly to the exterior radius of the pipe to be held. The two half-shells are secured to one another and to the body.

9 Claims, 6 Drawing Sheets

DEVICE FOR HOLDING PIPES

BACKGROUND OF THE INVENTION

1. Field of the Invention

The present invention relates to a device for holding pipes including two complementary parts intended for assembly. Each part has, in its assembly face, at least one recess of a semicylindrical shape that, when assembled, forms a shape roughly corresponding to the exterior cross section of a pipe to be held between the two parts.

2. Description of the Related Art

Very diverse embodiments of such pipe-holding devices are known.

In general, these known devices fall into two groups. The devices that fall within the first group are designed to allow axial sliding of the pipes with respect to each other and with respect to a support structure in order to account for thermal expansion of the pipes. The two complementary parts of these devices are made of a rigid material. The devices that fall within the second group deaden the vibrations of the pipes. At least one of the two complementary parts of these devices consists of an elastic material, at least for the portions in contact with the pipes, which prevents any axial mobility of the pipes relative to the device.

There are also pipe-holding devices of a modular type including two elements such as rails on which modular elements can be mounted selectively according to the diameter of the pipes that are to be held and according to the type of holding (i.e., with axial sliding or with vibration damping).

Now, to simplify manufacture, control and assembly and to reduce costs, it would be desirable to have pipe-holding devices which, while having a simple structure and being easy to use, could hold pipes allowing both axial sliding and the damping of vibrations.

SUMMARY OF THE INVENTION

The device for holding pipes according to the invention includes two complementary parts intended for assembly. Each part has, in its assembly face, at least one recess of a semicylindrical shape that, when assembled, forms a shape that roughly corresponds to the exterior cross section of a pipe to be held between the two parts. Each of the two parts of the device includes a body made of a rigid material having at least one recess with a radius that exceeds the exterior radius of the pipe to be held and which is lined with an intermediate half-shell made of an elastic material. The intermediate half-shell is further lined with an inner half-shell made of a rigid material with an interior radius that corresponds roughly to the exterior radius of the pipe. The two half-shells are secured to one another and to the body.

In the device according to the invention, each pipe to be held is therefore surrounded by a rigid shell, made up of two half-shells, allowing the pipe to slide axially. An elastic sleeve, formed of two half-sleeves or half-shells, is inserted between the rigid shell and the rigid body of the device thereby damping the vibrations of the pipe.

Within the context of the invention, the body, the elastic half-shell or half-shells, and the rigid half-shell or half-shells of each part could be manufactured separately and assembled, for example by bonding. However, it is preferable for the elastic half-shell or half-shells to be moulded directly in the gap between the recess or recesses of the body and the rigid inner half-shell or half-shells, by overmoulding the body and the rigid half-shell or half-shells.

Preferably, the body and the rigid inner half-shell or half-shells are produced by moulding in thermoplastic and the elastic intermediate half-shell or half-shells are formed of elastomer by overmoulding.

When the device is intended for attachment to a support structure, the cradle-forming part, which is intended to bear against the support structure, may advantageously include a premounting system. The premounting system may include at least one clip-fastening element intended to correspond with at least one hole formed in the support structure prior to final securing to the support structure, for example by using assembly screws with the two parts. Final securing is performed after the pipes have been installed on the cradle-forming part.

Preferably, the clip-fastening element may include a clip-fastening head held in a housing of the body of the cradle-forming part. The clip-fastening head is able to move in terms of translation between a rest position in which it is set back in the housing and an active position in which it head protrudes beyond the bearing face of the cradle-forming part.

With the clip-fastening element or preferably with the two spaced-apart clip-fastening elements of the cradle-forming part being in the rest position, the cradle-forming part may be placed on the support structure roughly in the assembly position and the clip-fastening head of the clip-fastening element or elements may be moved into the active position, for example by pressing using a tool such as a screwdriver. In the active position, the head of each clip-fastening element may be clipped into the corresponding hole in the support structure. This considerably simplifies the installing of the pipes prior to the final assembly of the two parts and attachment of the assembly to the support structure, for example by using screws.

According to a preferred embodiment, the clip-fastening element includes, between the widened clip-fastening head located at one end and a widened guide heel located at the opposite end, an elastically deformable intermediate positioning portion. The housing that houses the clip-fastening element includes two widened end portions. One end portion houses the clip-fastening head and the other end portion houses the guide heel. The housing also houses a reduced-width intermediate stop portion which acts as a double stop for the head and for the positioning portion in the rest position and as a double stop for the heel and for the positioning portion in the active position once the positioning portion of the clip-fastening element has passed through the stop portion of the housing through elastic deformation of the positioning portion.

In the event that it is not possible to attach the pipes to the support structure using the holding device attached to the structure, it is possible, using the device according to the invention, to hold these pipes with respect to one another in an intermediate position without attachment to a support structure. In this case, it is preferable, in order to avoid unwanted slipping of this attachment-free holding device, for a rigid inner half-shell of one of the parts of this device to have a passage hole through which a bulge of the material of the corresponding elastic intermediate half-shell projects inwards. Once the parts of the device have been tightened against one another using assembly screws, the bulge of elastic material prevents movement of the device with respect to one of the pipes, preferably with respect to the largest-diameter pipe.

BRIEF DESCRIPTION OF THE DRAWINGS

One illustrative and nonlimiting embodiment of a pipe-holding device according to the invention will be described in greater detail hereinbelow with reference to the attached drawings; in the drawings.

DETAILED DESCRIPTION OF THE INVENTION

Figure 1:
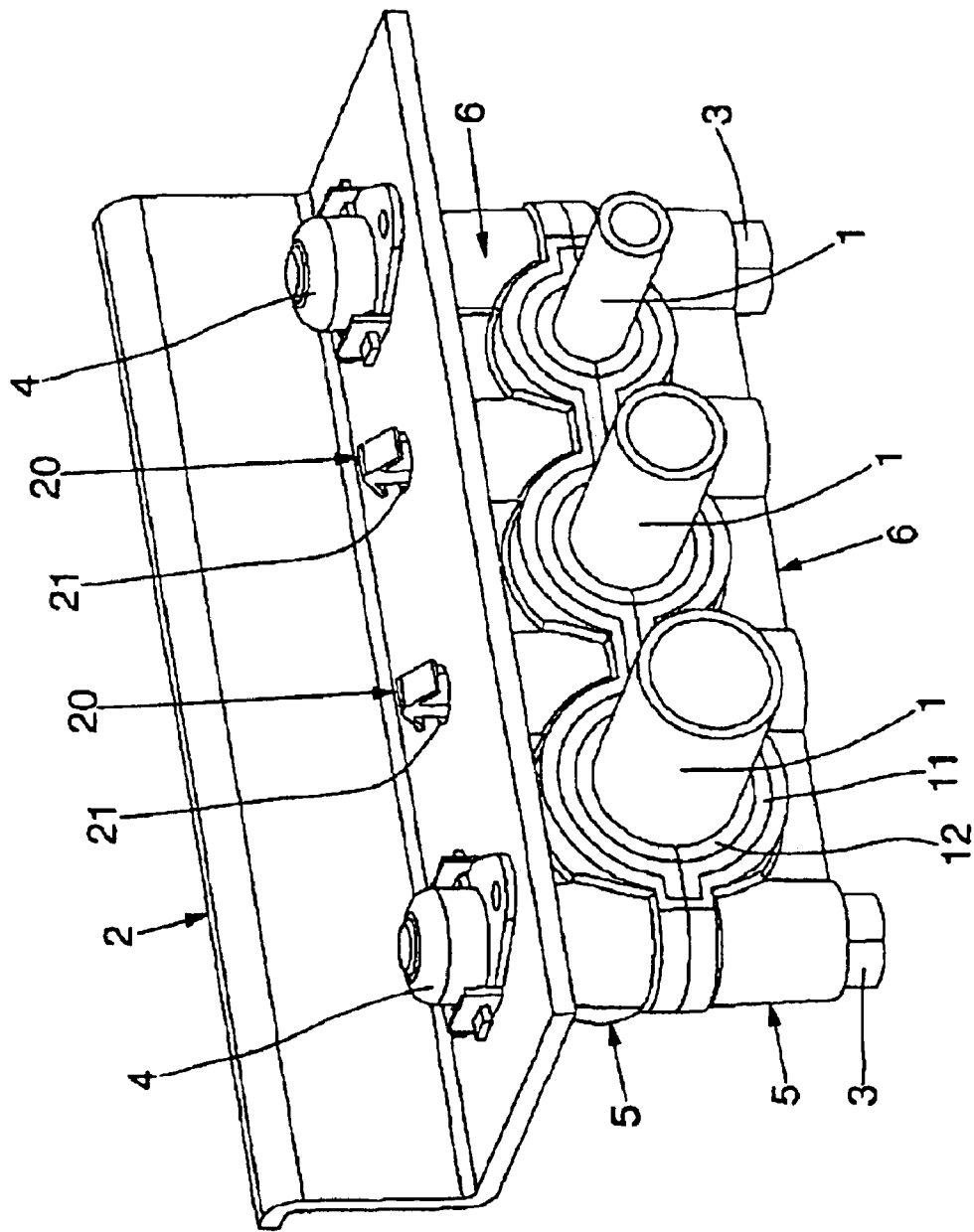
FIG. 1 is a perspective view of a device according to the invention after the two parts have been assembled and attached to a support structure.

The device as illustrated is intended to hold several pipes 1 in the same plane. As an example, three pipes are shown in FIG. 1 each having a different diameter.

The device according to FIGS. 1 to 5 is intended to be attached to a support structure 2 illustrated symbolically in the form of an angle bracket. The attachment may be made with the aid of two screws 3 and two nuts 4 which in this instance are nuts secured to support structure 2.

The holding device includes two symmetric identical parts 5. Each is formed, as shown especially in FIG. 3, as an elongate body 6 made of a rigid material, for example moulded in thermoplastic. Body 6 has several spaced apart recesses 9 of semicylindrical shape in its assembly face 8 between two passage holes 7. Between recesses 9, the parts each have passing through them a passage 10 which is parallel to the holes 7.

Each recess 9 has a radius greater than the radius of the pipe 1 intended to be held and is lined with an intermediate half-shell 11 made of an elastic material which is further lined with an inner half-shell 12 made of a rigid material. The interior radius of inner half-shell 12 corresponds roughly to the exterior radius of the pipe 1 to be held.

Figure 3:
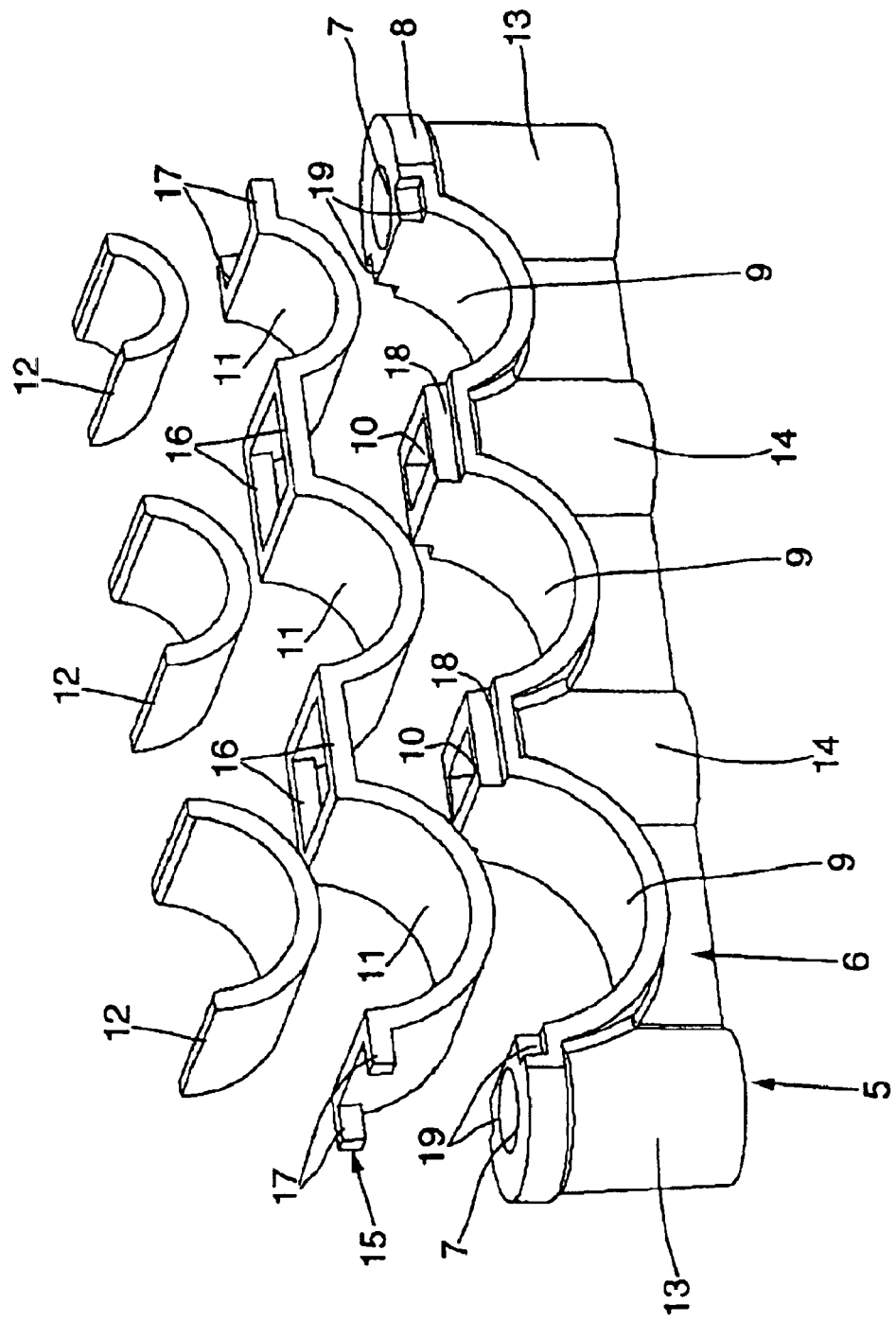
FIG. 3 is an exploded perspective view of part of the device of FIGS. 1 and 2.

As can be seen in FIG. 3, body 6 includes thicker portions 13 around the holes 7 at the two ends and thicker portions 14 around passages 10. The intermediate half-shells 11 are made of an elastic material, line recesses 9 in body 6 of the part 5, and are made in the form of a one-piece assembly 15. Intermediate half-shells 11 are joined together by two connecting strips 16 and extended at both ends by strips 17. Body 6 of the part 5 has grooves 18, 19 formed at the assembly face 8 to house strips 16, 17.

In contrast, inner half-shells 12 are separate from one another.

Such an arrangement makes it possible, for example, to produce assembly 15 including intermediate half-shells 11 and strips 16 and 17 by overmoulding, in other words, by moulding in the gap between recesses 9 of body 6 and the rigid inner half-shells 12. Body 6 and rigid inner half-shells 12 are placed in a mould and an elastomer intended to form assembly 15 is injected into the gap between body 6 and inner half-shells 12.

Each part 5 thus constitutes a one-piece assembly which, although consisting of at least two different materials, requires no special arrangements for connection between the various materials because of the overmoulding.

Figure 2:
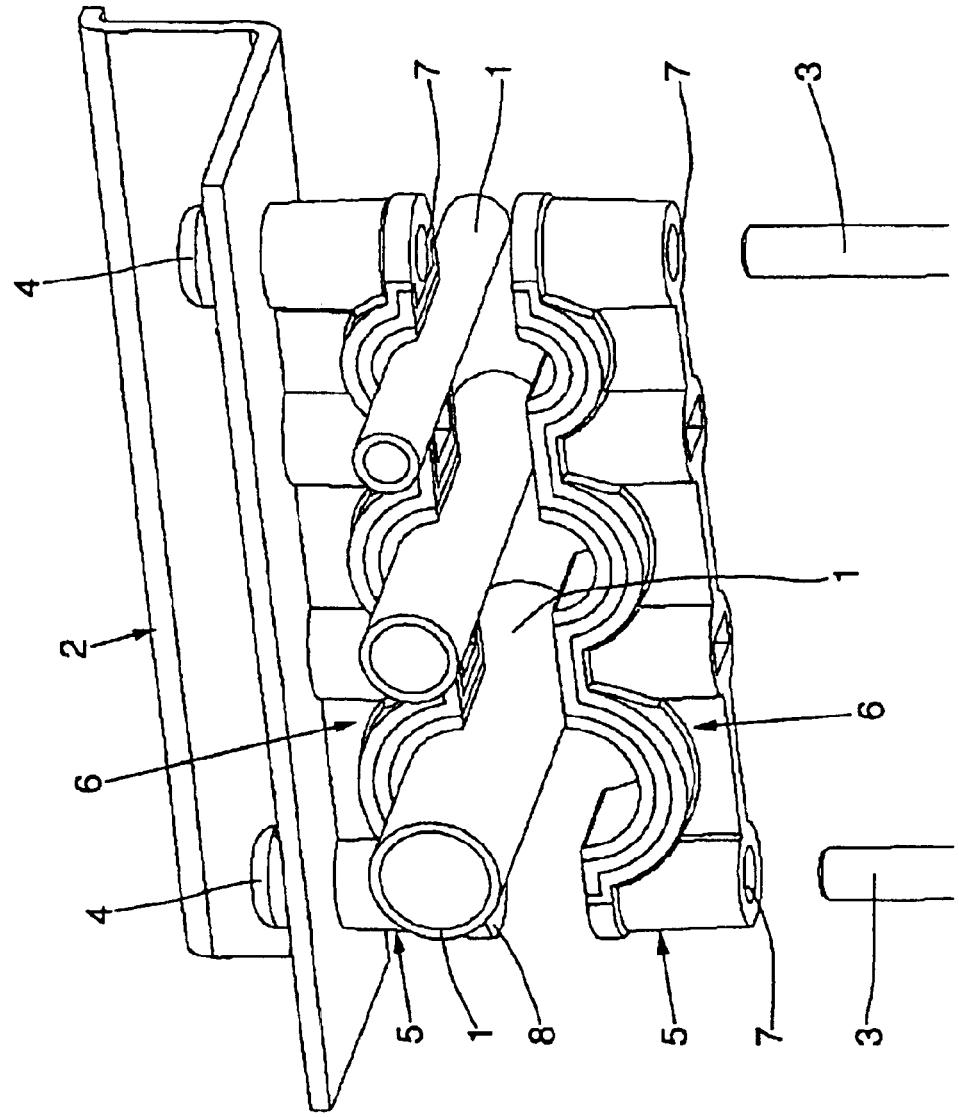
FIG. 2 is a perspective view of the device of FIG. 1 before the two parts of the device have been assembled and fixed definitively to the support structure.

For assembly and attachment of the holding device including the two parts 5 on a support structure such as the angle bracket 2 as shown in FIGS. 1 and 2, it is possible to use only screws 3 and nuts 4.

Figure 4:
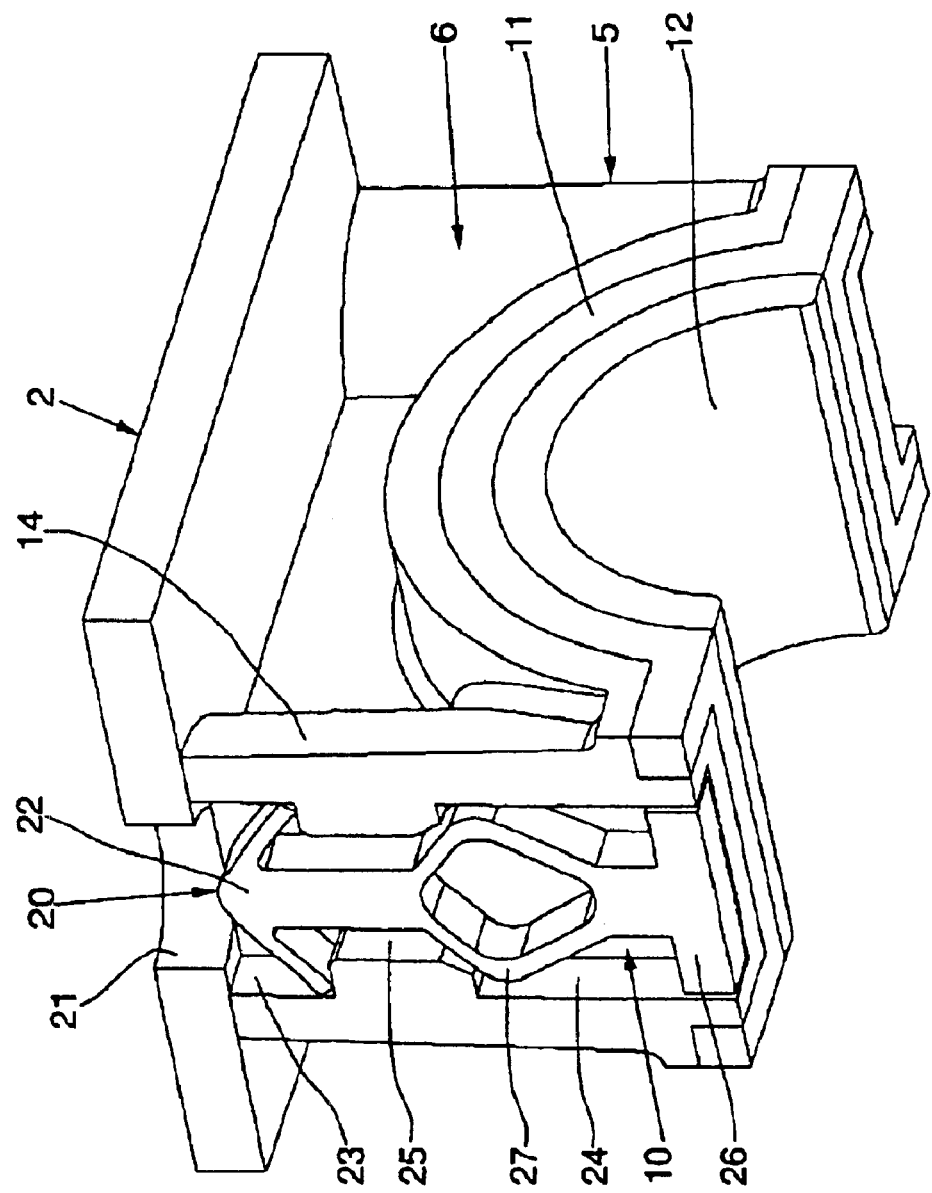
FIG. 4 is a perspective view, in part section, of the cradle-forming part of the device of FIGS. 1 and 2 showing a clip-fastening element of the premounting system in the rest position.
Figure 5:
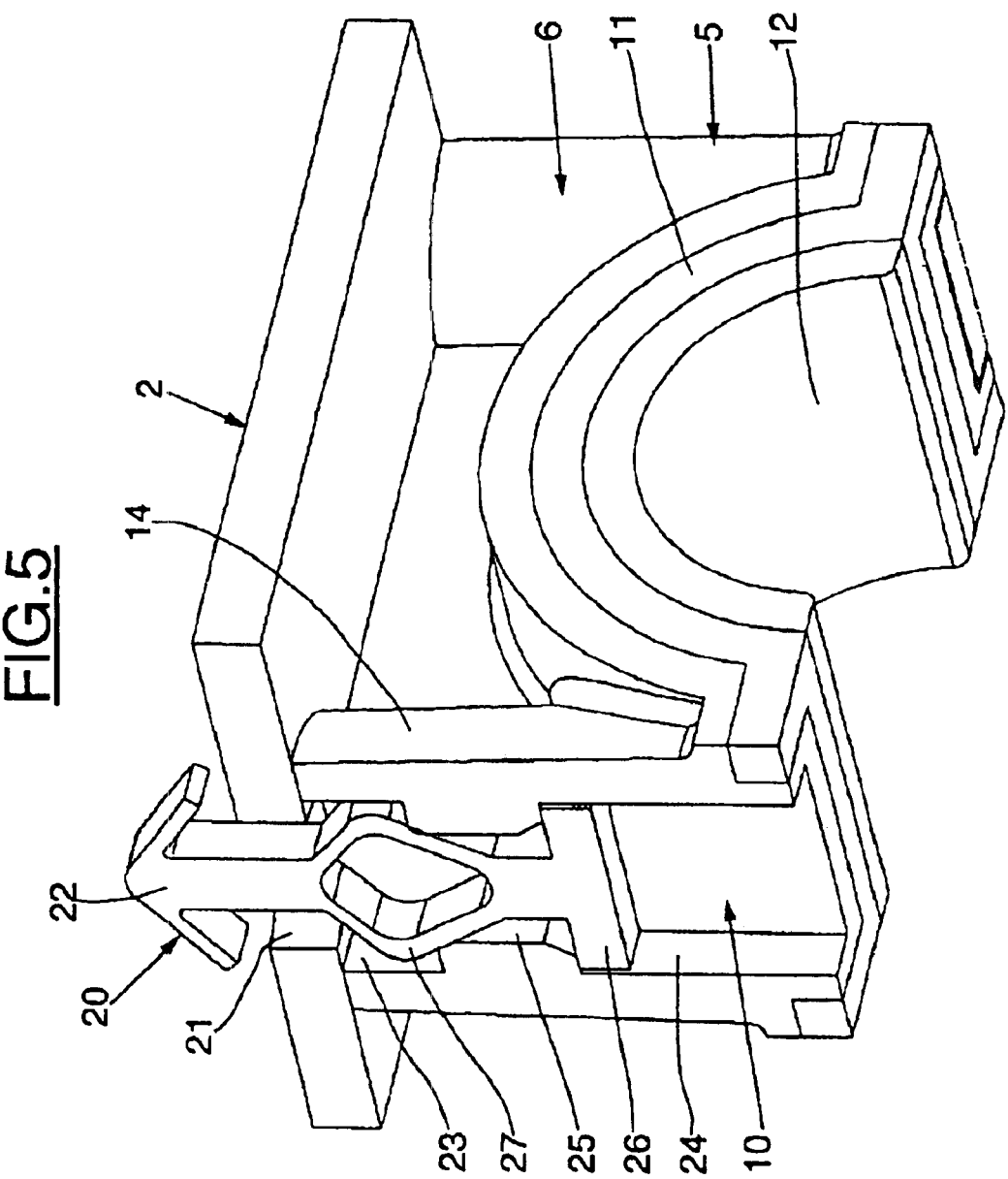
FIG. 5 is a perspective view, in part section, of the cradle-forming part of the device of FIGS. 1 and 2 showing a clip-fastening element of the premounting system in the active position.

However, when, prior to this attachment, it is necessary to mount the pipes 1 between the two parts 5, it is simpler for the cradle-forming part intended to bear on the support 2 to be prepositioned on the support. As shown in FIGS. 4 and 5, the device may selectively have a premounting system including two clip-fastening elements 20 each of which is intended to correspond with a hole 21 formed in the support structure 2 before the device is completely attached using screws 3 and nuts 4.

As shown in FIGS. 4 and 5, passage 10 acts as a housing for each clip-fastening element 20 in the cradle-forming part and includes two widened end portions 23 and 24 and a reduced-width intermediate portion 25. The clip-fastening element 20 includes an elastically deformable intermediate part 27 forming a spring, for example a hollowed part in the shape of a diamond, located between a widened clip-fastening head 22, for example in the shape of an arrow, at one end and a widened guide heel 26 at the opposite end. Clip-fastening element 20 may be housed in housing 10 by forcing head 22 into the widened portion 24 of housing 10 so that head 22 passes through the reduced-width portion 25 and relaxes in the portion 23. In this position, the portion 25 of housing 10 acts as a double stop for head 22 and for portion 27 of element 20 and holds the latter in this position, as illustrated in FIG. 4, in which head 22 is set back in housing 10.

To preposition the cradle-forming part 5 on support 2, a screwdriver, for example, may be used to exert pressure on heel 26 of element 20 causing element 20 to move from the set-back position into an active position as shown in FIG. 5. Portion 27, which forms the spring, having passed through the reduced-width portion 25 of housing 10, relaxes into portion 23 with the clip-fastening head 22 protruding beyond the bearing face of the cradle-forming part 5. All that is then required is for part 5 to be placed in the mounting position on the support 2 and for heads 22 of elements 20 to be clipped into holes 21 in support 2. The cradle-forming part 5 is then held, more or less, in the correct position on support 2.

Pipes 1 are then placed into the inner half-shells 12 of the cradle-forming part 5. The cap-forming part 5 may then be attached and the two parts 5 may be assembled and secured to support 2 using screws 3 and nuts 4.

When pipes are laid, for example onboard aircraft, the support structure does not always allow the attachment of a holding device for a length greater than the maximum prescribed distance between two fixing locations. In this case, it is known practice for the pipes to be held in an intermediate position with respect to one another without attaching them to a support structure. However, in such cases it is necessary to immobilize these unattached holding devices with respect to at least one of the pipes so as to avoid any unwanted movement of the devices along the axis of the pipes, for example under the effect of thermal expansion.

The holding device attached as described hereinabove and as illustrated in FIGS. 1 to 5 is distinguished through the fact that the inner half-shells 12 of a rigid material are in contact with the pipes in order to allow the pipes to move in terms of translation along their axis with respect to the holding device.

Now, through a simple modification to the embodiment already described, the holding device according to the present invention can also be used for holding pipes without attachment to a support structure.

Figures 6, 7:
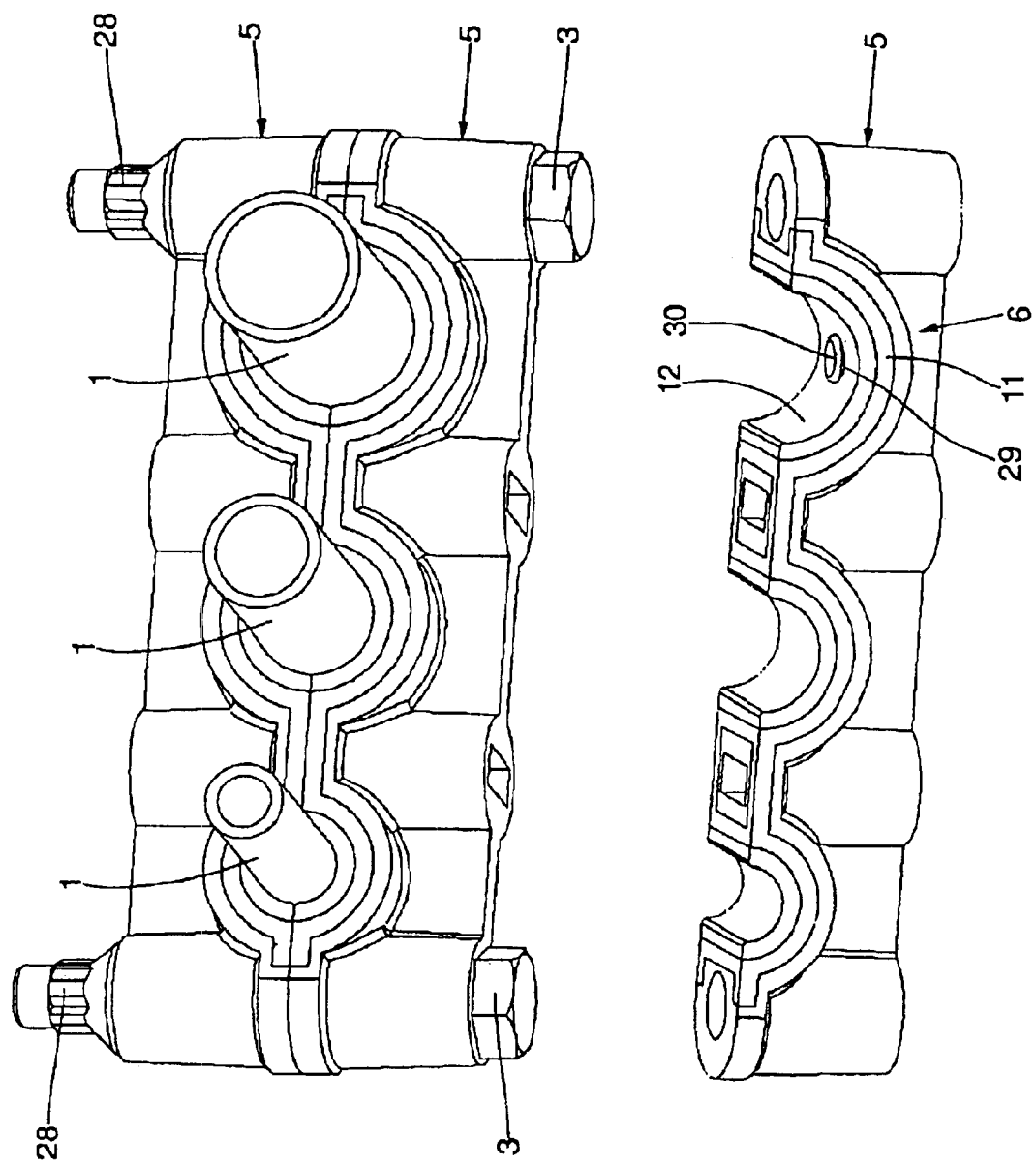
FIG. 6 is a perspective view of a holding device unattached to a support structure.
FIG. 7 is a perspective view of part of the device of FIG. 6 showing the mechanism for preventing movement of a pipe with respect to the device.

FIG. 6 illustrates the device according to the invention in its application to the holding of pipes 1 without attachment to a support structure. The two parts 5 are assembled around pipes 1 using screws 3 and nuts 28 where nuts 28 are assembly nuts rather than attachment and assembly nuts such as nuts 4 which were used to secure the assembly to support 2 as shown in FIGS. 1 and 2.

To prevent the holding device from moving inadvertently with respect to pipes 1, inner half-shell 12, which is made of a rigid material and lines one of the recesses of body 6 of at least one of the two parts 5, has a passage hole 29 through which a bulge 30 of the elastic material of the corresponding intermediate half-shell 11 projects inwards as shown in FIG. 7. Bulge 30 holds the device in place following assembly around pipes 1 using screws 3 and nuts 28 with respect to the pipe housed in inner half-shell 12.

Bodies 6 of parts 5 of the device as described and depicted, as well as the rigid inner half-shells 12, may preferably be moulded in thermoplastic. Assemblies 15 including elastic intermediate half-shells 11 are preferably made by overmoulding of bodies 6 and inner half-shells 12 by injecting elastomer into the gap between bodies 6 and inner half-shells 12.

Of course, the embodiment depicted and described has been given merely by way of illustrative and nonlimiting example and can be modified and varied in many ways both with regards to the number of pipes to be held using one and the same device (for example 2, 3, 4, 5 or more) and the diameters of its pipes, which may be the same or different, as required.

What is claimed is:

1. A device for holding pipes comprising two complementary parts, intended for assembly, each having in its assembly face at least one recess of a semicylindrical overall shape, wherein the corresponding recesses of the two complementary parts form a shape that is adapted to roughly correspond to the exterior cross section of a pipe to be held between the two complementary parts upon assembly, wherein each of the two complementary parts comprises a body in which are disposed the at least one recess, wherein the body comprises an at least partially rigid material, wherein the radius of at least one of the recesses is adapted to exceed the exterior radius of the pipe to be held, wherein at least one of the recesses is lined with an intermediate half-shell made of elastic material, and wherein the intermediate half-shell is lined with an inner half-shell made of a rigid material, wherein the interior radius of the inner half-shell is adapted to correspond roughly to the exterior radius of the pipe, wherein the intermediate half-shell and the inner half-shell are secured to one another and to the body.

2. The device of claim 1, wherein the intermediate half-shell made of an elastic material is moulded in a gap between the recess of the body and the rigid inner half-shell.

3. The device of claim 2, wherein the body and the rigid inner half-shell comprises a molded thermoplastic, and wherein the intermediate half-shell comprises an over-molded elastomer.

4. The device of claim 1, wherein the device is configured for attachment to a support structure.

5. The device of claim 4, further comprising a cradle-forming part, intended to bear against the support structure, wherein the cradle-forming part comprises a premounting system comprising at least one clip-fastening element intended to correspond with at least one hole formed in the support structure prior to final securing of the two complementary parts.

6. The device of claim 5, wherein the clip-fastening element comprises a clip-fastening head positioned in a housing of the body of the cradle-forming part, wherein the clip-fastening element is able to move in terms of translation between a rest position in which the clip-fastening head is set back in the housing and an active position in which the clip-fastening head protrudes beyond the bearing face of the cradle-forming part.

7. The device of claim 6, wherein the clip-fastening element comprises an elastically deformable intermediate positioning portion positioned between the clip-fastening head located at one end and a guide heel located at the opposite end, wherein the housing comprises a passage positioned between two widened end portions, wherein one end portion houses the clip-fastening head and the other end portion houses the heel guide, and wherein the passage comprises a reduced-width intermediate stop portion acting as a double stop for the head and for the positioning portion in the rest position and as a double stop for the heel and for the positioning portion in the active position once the positioning portion has passed through the stop portion through elastic deformation of the positioning portion.

8. The device of claim 1, wherein the device is configured to hold several pipes without attachment to a support structure.

9. The device of claim 8, wherein the rigid inner half-shell of at least one of the two complementary parts comprises a passage hole through which a bulge of the material of the elastic intermediate half-shell projects to prevent the device from moving relative to one of the pipes upon assembly of the two complementary parts around the pipes.

* * * * *